US 6,555,984 B1

(12) United States Patent
Rajala et al.

(10) Patent No.: US 6,555,984 B1
(45) Date of Patent: Apr. 29, 2003

(54) ARRANGEMENT AND METHOD FOR AN ELECTRIC MACHINE

(75) Inventors: Erkki Rajala, Vaasa (FI); Erkki Leskelä, Laihia (FI); Arto Makkonen, Vaasa (FI); Jouni Ikäheimo, Panttila (FI)

(73) Assignee: ABB Oy, Helsinki (FI)

( * ) Notice: Subject to any disclaimer, the term of this patent is extended or adjusted under 35 U.S.C. 154(b) by 0 days.

(21) Appl. No.: 09/743,807

(22) PCT Filed: Jul. 13, 1999

(86) PCT No.: PCT/FI99/00619

§ 371 (c)(1),
(2), (4) Date: Feb. 23, 2001

(87) PCT Pub. No.: WO00/05806

PCT Pub. Date: Feb. 3, 2000

(30) Foreign Application Priority Data

Jul. 23, 1998 (FI) .................................................. 981656

(51) Int. Cl.$^7$ ............................................... G05B 19/18
(52) U.S. Cl. ..................... 318/569; 318/567; 318/568.1; 318/600
(58) Field of Search .............................. 318/567, 568.1, 318/569, 600

(56) References Cited

U.S. PATENT DOCUMENTS

| 4,639,645 A | | 1/1987 | Hartwig ........................ 318/51 |
| 4,829,221 A | * | 5/1989 | Grunberg et al. ............ 318/587 |
| 4,833,388 A | * | 5/1989 | Dorner ......................... 318/800 |
| 5,089,759 A | * | 2/1992 | Miotke et al. ........... 318/568.11 |
| 5,473,229 A | * | 12/1995 | Archer et al. ................ 318/254 |
| 5,672,943 A | | 9/1997 | Vivers ......................... 318/103 |
| 5,684,374 A | * | 11/1997 | Chaffee ...................... 318/616 |
| 5,909,372 A | * | 6/1999 | Thybo ......................... 364/188 |
| 5,977,739 A | * | 11/1999 | Ohsawa ....................... 318/685 |
| 6,160,630 A | * | 12/2000 | Takayanagi ................. 358/1.12 |
| 6,211,639 B1 | * | 4/2001 | Meister et al. ............. 318/568.2 |

FOREIGN PATENT DOCUMENTS

| DE | 40 37 458 A1 | 5/1992 |
| DE | 4037458 A1 | 5/1992 |
| EP | 0684692 A2 | 11/1995 |
| EP | 0 684 692 A2 | 11/1995 |
| WO | WO 98/01831 | 1/1998 |
| WO | WO 9801831 A1 | 1/1998 |

OTHER PUBLICATIONS

Patent Abstract of Japan, JP 5083985 dated Apr. 2, 1993.

* cited by examiner

Primary Examiner—Robert E. Nappi
Assistant Examiner—Rina I. Duda
(74) Attorney, Agent, or Firm—Arent Fox Kintner Plotkin & Kahn PLLC (57) ABSTRACT

A system having an electric machine, memory device for storing information concerning the electric machine and is attached to the electric machine, and at least one control unit for controlling the operation of the electric machine. Furthermore, the system of the present invention has an interface between the memory device and the at least one control unit so that the at least one control unit reads the information stored in the memory device. The control unit processes the information read from the memory device such that the information becomes verified with default parameters of the system after read-out-thereof. In case the information includes parameters, which do not match in a predefined manner with the default parameters, the control unit is arranged to either automatically, adjust the system in accordance with the information received from the memory device or to prevent start-up of the electric machine or the entire system.

20 Claims, 5 Drawing Sheets

ARRANGEMENT AND METHOD FOR AN ELECTRIC MACHINE

FIELD OF THE INVENTION

The present invention relates electric machines, and more precisely, but not exclusively, to installation procedures of an electric machine to a system comprising means for controlling operation of the electric machine and/or other apparatus connected to the electric machine. The invention relates further to a method of installing an electric machine to a system.

BACKGROUND OF THE INVENTION

Various kinds of electric machines are known. In the industry, the most common electric machine is an alternating current electric motor, such as an asynchronous induction motor or a synchronous motor, providing rotational or linear movement through the output shaft or similar means thereof. The other group of electric machines is formed by generators or alternators providing electricity as output, i.e. accomplishing an opposite electricity-mechanical power transformation. The skilled person is familiar with the general structure, operation, functionality and use of various electric machines, and thus these are not explained in more detail herein.

Normally, the size of an electrical motor is determined by the torque demands and type of the driven device in the system. The system in which the motor is used usually includes various apparatus and components which have to be properly dimensioned and selected relative to each other to avoid any damages caused by improper and unmatching components of the system. For instance, the apparatus of a fixed-speed motor drive such as switches, fuses, contactors, measurement transformers, etc. in the motor starter are selected so that their electrical performance matches the maximal currents, voltages, etc. of the motor.

The motor starters or components thereof may be replaced during maintenance, repair or installation of new equipment to the system. Of course, the size and performance of the replaced or installed components must again match to the size of the motor and/or the other parts and components of the system. It is also possible that the motor or several motors is/are replaced without replacing the motor starter or other components of the system (even if e.g. the motor size changes a little).

Three types of motor starters and feeders which are located in the switchgear are normally used. The fixed motor starter or feeder has relatively low installation cost but when the switchgear has been disconnected from the supply voltage an adding or removing of motor starters or feeders or their components must be performed. Removable motor starter or feeder units can be removed from the equipment compartment when the switchgear is connected. The removable units have plug-in connections to the incoming supply from the distribution bar system in the switchgear, whereas the outgoing cables are connected permanently directly to the apparatus terminals. The electrical connections of a withdrawable type (cassette type) motor starter or feeder are of the plug-in-type which makes its mounting and dismounting very fast. Removable or withdrawable motor starters or feeders are often replaced by another unit during maintenance. It is possible that the replacing unit does not always have equivalent components and thus the quality of motor control or protection may be reduced.

In the case of variable-speed drives, the size and the parameters of the frequency converter installed in the system must be properly selected based on the motor information to ensure correct control and protection of the motor.

The electric machines, and especially electric motors are often protected by a protective device, such as by an electronic protection relay, against e.g. too high voltage or current rates of the system. Before the electric motor is taken into use, the protective device has to be adjusted to take the specific parameters of the particular electric motor into account, so that a correct "level of protection" is defined for that particular electric motor to be protected.

The required parameters are announced by a special label or plate fixedly attached on the motor housing, usually in a position from which it can be readily seen. This label is often referred to as rating (or rate) plate. Sometimes the label is also referred to as value label (or plate) or type label (or plate). Several international and national standards, such as IEC 34-1, have set the minimum amount of information to be disclosed by a rating plate. Usually the parameters in the rating plate include at least the following information: voltage (U), current (I), power (W), cos $\psi$ value, frequency (f), and r/min rate. A rating plate may also include some additional information considered as useful and/or necessary. The additional information includes data such as the phase of the motor, the manufacturer, those standards the motor fulfils/according to which it has been constructed, weight of the motor, special conditions for use, etc.

When installing an electric motor, a technician accomplishing the assembly adjusts or configures manually the protective device and/or other control means in accordance with the information he can read from the rating plate. This manual set up and configuration is time consuming and sensitive to human errors. Especially in cases where the motor is to be assembled to form a part of a substantially large system, the losses e.g. in production, and thus the costs for the losses, can become high during this manual configuration work. In addition, the manual configuration involves always a risk for human errors (e.g. a misread of the rating plate, using the rating plate of another motor, an incorrect setting or a "forgotten" and thus undefined parameter).

In addition to the information shown by the rating plate, the control means of a system to which an electric motor has been installed to form a part thereof, may require some additional information to be fed in during the set up and configuration thereof and before the electric motor can be taken into use. This additional information is required especially in cases were condition evaluating and/or overall management and/or control systems are in use. Also frequency converters that supply variable-speed drives need information not normally shown on the rating plate. This additional information may include instructions and parameters for a lubrication system, information concerning the parameters of the bearings installed in the motor, information concerning the thermal behaviour of the motor, information concerning the protection and/or control devices, information concerning maintenance of the motor, etc.

At present this kind of information required by the system algorithm is fed manually to the system, for example by the technicians assembling and configuring the system or the operators using and controlling the system or service personnel accomplishing maintenance or repair to the system. This manual feeding of data involves the same problems as already mentioned above in connection with the manual feeding of the rating plate information.

In the U.S. Pat. No. 5,672,943 (Vivers), "Electronic Control Apparatus", a separate non-volatile memory for storing the location address of each function unit has been presented. Here, the memory unit is physically associated with each motor such that it is resident in the cabling marshalling area of the motor control centre cubicle. When the control wiring has been fixed, the address information can be transferred from the memory unit of the motor to the control unit, and thereafter it can be used by control unit to retrieve information from a location indicated by said address.

U.S. Pat. No. 5,672,943 disclosure focuses on reading a location address information and getting the data from elsewhere based on this address. U.S. Pat. No. 5,672,943 suggest a memory that suits only for withdrawable cassette-type motor units. It does not suggest any possibility to detect and/or to check that a motor or any other component of the system has been replaced, or that the replaced component can be used in the system. There is no actual suggestion how to set-up the system automatically. In a system according to U.S. Pat. No. 5,672,943 one would have to change also the data memory in the motor control centre cubicle or contents of the memory to identify a different motor. The information has to be entered manually to the non-volatile memory of the prior art disclosure during motor installation.

SUMMARY OF THE INVENTION

It is an object of the present invention to overcome the disadvantages of the prior art arrangements and to provide a totally new type of solution for installation of an electric machine to a system and/or set-up and/or configuration of a system including at least one electric machine.

An object of the present invention is to provide a solution by means of which a reliable and automatic manner for installing an electric machine to a system including control means for controlling the operation of the electric machine.

An object of the present invention is to provide a solution by means of which the set-up and/or configuration time of a system into which a new electric machine or another component has been installed is decreased.

An object of the present invention is to provide a solution by means of which a risk for human errors during installation and set-up and/or configuration procedures of an electric machine and/or a system including an electric machine is minimised.

An object of the present invention is to provide a solution by means of which parameters relating to a new electric machine to be installed in a system are automatically identified and the system parameters are subsequently updated correspondingly.

An object of the present invention is to provide a solution by means of which correct rating of an electric motor, control means and protection means and a combination of these equipment can be automatically checked.

An object is to provide a new type interface between the electric machine and the control means for data communications.

A further object is to provide means enabling a new type of read-out and/or configuration of machine related parameters of an electric machine.

Other objects and advantages of the present invention will be brought out in the following part of the specification taken in conjunction with the accompanying drawings.

The objects are achieved by providing a system comprising an electric machine, memory means for storing information concerning the electric machine and fixedly attached in connection with the electric machine, at least one control unit adapted to control the operation of the electric machine, an interface between the memory means and said at least one control unit so that said at least one control unit is enabled to read the information stored in the memory means. In the system the control unit is arranged to process the information read from the memory means such that the information becomes verified with default parameters of the system after read-out thereof. In case the information includes parameters which do not match in a predefined manner with the default parameters, the control unit is arranged to either automatically adjust the system in accordance with the information received from the memory means or to prevent start-up of the electric machine or the entire system.

The inventive method of installing an electric machine to a system, said system comprising control means controlling the operation of the electric machine when the electric machine is installed in the system, comprises steps of storing information relating to the electric machine in a memory means attached in connection with the electric machine, reading at least a part of the information stored to the memory means by the control means via an interface between the memory means and the control means, comparing the read information with default parameters to ensure that the electric machine can be used in the system, and in case the read information includes parameters which do not match in a predefined manner with the default parameters either automatically adjusting the control means and/or the system in accordance with the read information or preventing the electric machine and/or system to be started.

Accoding to a further aspect, a rating plate for an electric machine is provided. The rating plate comprises visually readable motor specific rating information in one side thereof. The rating plate is further provided with electric memory means for storing motor specific rating information and means for interfacing a remote control means to enable a read-out of the information by the remote control means.

Several advantages are obtained by means of the present invention. All important information or data concerning an individual electric machine will be stored in memory means attached directly to the machine, such as to an special data chip, microchip or electronic tag attached to the electric machine or a new type rating plate including integrated memory means. All parameters of the electric machine required by the control and/or monitoring equipment of the system or similar apparatus are automatically configured during the installation and set-up procedures, and correspondingly updated at later stages, if this is required. The set-up, configuration and update procedures can be accomplished in a reliable manner, and the risk for human errors in infeeding the data into the controlling means is minimised, while the installation and set-up and/or configuration time is minimised. In case an electric machine has to be replaced by another one in a system including several components, the down time of the system is minimised due to the minimised set-up and configuration time of the electric machine to be changed. The solution ensures that the electric machine and the auxiliary devices match to each other, and that they are driven and protected with correctly selected parameters, and prevent a start-up in a case there is a risk for damages or hazardous situations. Due to the fact that the system parameters relating to the installed electric machine, such as protection parameters, are optimised and selected properly, and this selection and the infeed of the data can be trusted to be correct, the electric machine can be driven in full and optimized capacity. During maintenance of the machinery the risk for incorrect and/or unmatching components and/or configurations is reduced. In case an incorrectly sized replacement machine is installed to the system, any damages or breakages can be avoided as the system knows that the machine is improper, and cannot be run without a risk for damaging the motor or the system itself. An advantage is also that the present invention can be used with all types of motor starters (e.g. fixed, removable or withdrawable cassette-type unit). In addition, the memory unit attached to the motor may contain parameter values, data and information measured or determined specifically for that motor unit by the motor manufacturer or maintenance technician. This data can also be updated during e.g. annual check-ups. The information, such as electrical rating plate data of the electrical motor or the components in the motor starter, can be utilised directly in the system. The present invention makes it also possible to automatically check the short-circuit co-ordination of the motor control system (for example according to the norm IEC 947).

In the following the present invention and the other objects and advantages thereof will be described by way of examples with reference to the annexed drawings, in which similar reference characters throughout the various figures refer to similar features.

DETAILED DESCRIPTION OF THE DRAWINGS

Figure 1:
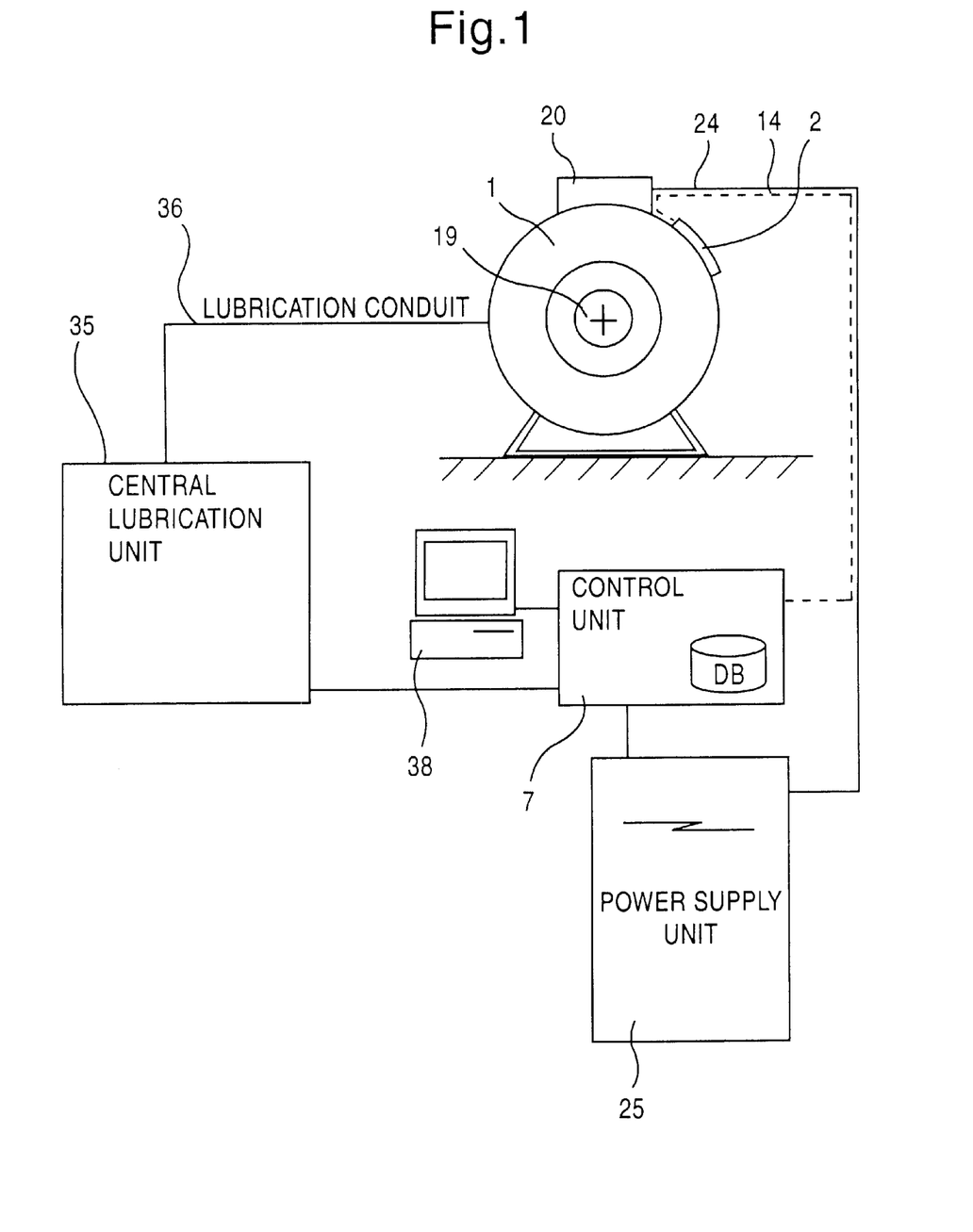
FIG. 1 discloses a schematic presentation of one embodiment of the present invention.

A schematic view of FIG. 1 discloses an embodiment of the present invention. An electric motor 1, such as a three chase induction motor, comprises a rotatable shaft 19 connected to a rotor (not shown) within the shell of the motor in a manner per se known in the art. A connection housing 20 for connecting necessary cables or wirings to the motor 1 is provided on top of the shell. A power supply unit or power source 25 provides the necessary electric power to the motor via a conduit 24 connected to the connection housing 20. The power supply unit 25 is controlled by a control unit 7, which is arranged, among other things, to control the operation of the motor 1 by controlling the power source 25. This control implements tasks such as starting, acceleration and stopping of the motor, adjusting the rotational speed and power thereof etc. control operations well known in the art. It is also possible to arrange the control means 7 to monitor the operation, condition and functions of the motor, as will be explained later on.

Instead of a more conventional control device (such as the device controller 7 in FIG. 2), the control means 7 can consist of a suitable data processing device, such as a computer of microcomputer comprising a central processing unit (CPU), and ROM and RAM memories. The control means 7 may also be connected further to another data processing devices, such as to microcomputer 38, and/or to a larger management/control system, such as to an overall production management system or open control system of a factory. Instead of a complete computer device 38 of FIG. 1, the external device connected to the control unit 7 can also be only a display or a printer etc. outputting device.

The motor 1 is provided with a memory means 2. In the example of FIG. 1 the memory means comprises a motor information chip 2 fixedly attached to the outer shell of the motor housing, but any other position in or on the motor structure is also possible. Appropriate chips (or microchips) or attached electric tag memories which can readily be used as the memory means are per se known, and can be of any appropriate type which can be attached to the motor and are capable of storing information and enable a subsequent readout or retrieval of the information stored therein. Electrically erasable programmable memory (EEPROM) is one preferred technology for the memory means.

The data specific to a certain motor type can be stored in the chip in advance, whereafter the "pre-programmed" chip is attached to the motor of that type e.g. during the manufacture or final inspection thereof. According to one possibility a motor specific data relating to the electric motor under manufacture is stored or programmed in the chip 2 while the motor is still in the workshop and under manufacture, or after the motor has been tested in a testing or inspection station or similar facility after the manufacture.

In the above alternatives the assembly of the chip is done by the manufacturer of the electric motor. Even though this is a preferred solution, it is, of course possible, that the memory means including motor specific data is attached to the electric motor in some other stage, such as just before the actual installation of the electric motor to the overall system. This can be done e.g. by the technician accomplishing the actual assembly work. In addition, the technician may update the motor related information when a need for this arises, e.g. after a periodical check-up of the motor.

The computer or a PC (Personal computer) 38 may also be a portable computer which is connected to the control unit or some other interface in the system enabling a data connection to the memory means 2 only when this is required. The technician may use the computer 38 to read the parameters stored in the memory means and/or write and store some new information in the memory means and/or configure the already existing parameters.

As was already discussed, the information included in the memory means 2 may include all parameters and data disclosed by a rating plate, as well as information relating to lubrication, maintenance, monitoring or control of the motor, special conditions, estimated bearing and/or overall condition of the motor etc.

The interface between the memory means 2 and the control unit 7 is arranged by means of a communications line or wire 14 allowing bi-directional data traffic between the memory means 2 and the control unit 7. According to one possibility the same wiring as is used for the power supply (cable 24) can be used for data transmission as well, and thus a separate wiring 14 for the data communications is not a necessity for accomplishing the data communications arrangement.

In addition to a fixed connection between the memory 2 and the control 7, the interface can comprise e.g. an infrared or radio connection, or similar arrangement enabling a read-out of the remote memory means 2. According to one possibility, a portable computer or similar read-out device is connected by the technician either directly to the memory means or to the system such that the parameters can be read-out therefrom. Thereafter the portable computer is connected to the the control unit or to a component requiring the parameters and the parameters are transmitted further to the unit or component from the portable computer. According to a further alternative, the interface is provided such that the data in the memory means is read by a special reader device positioned in close relation with the memory means or contacting the memory means at some stage during the installation procedure, whereafter the data is transmitted from this device to the control means of the system.

In addition, FIG. 1 discloses a lubrication centre unit 35 of a central lubrication system. The operation of this is also controlled by the controlled unit 7 through a data communications line therebetween. In addition, FIG. 1 discloses a lubrication conduit 36 connected to the motor 1 providing the necessary lubrication medium to the motor in accordance with the lubrication parameters read-out from the memory chip 2.

The system is such that the control unit 7 is arranged to read-out motor specific information from the memory means 2, and thereafter to compare this information with predefined default parameters of the system stored in a database of the control unit, or otherwise accessible by the control unit. The verifying procedure will be explained in more detail in connection with FIG. 4.

Figure 2A:
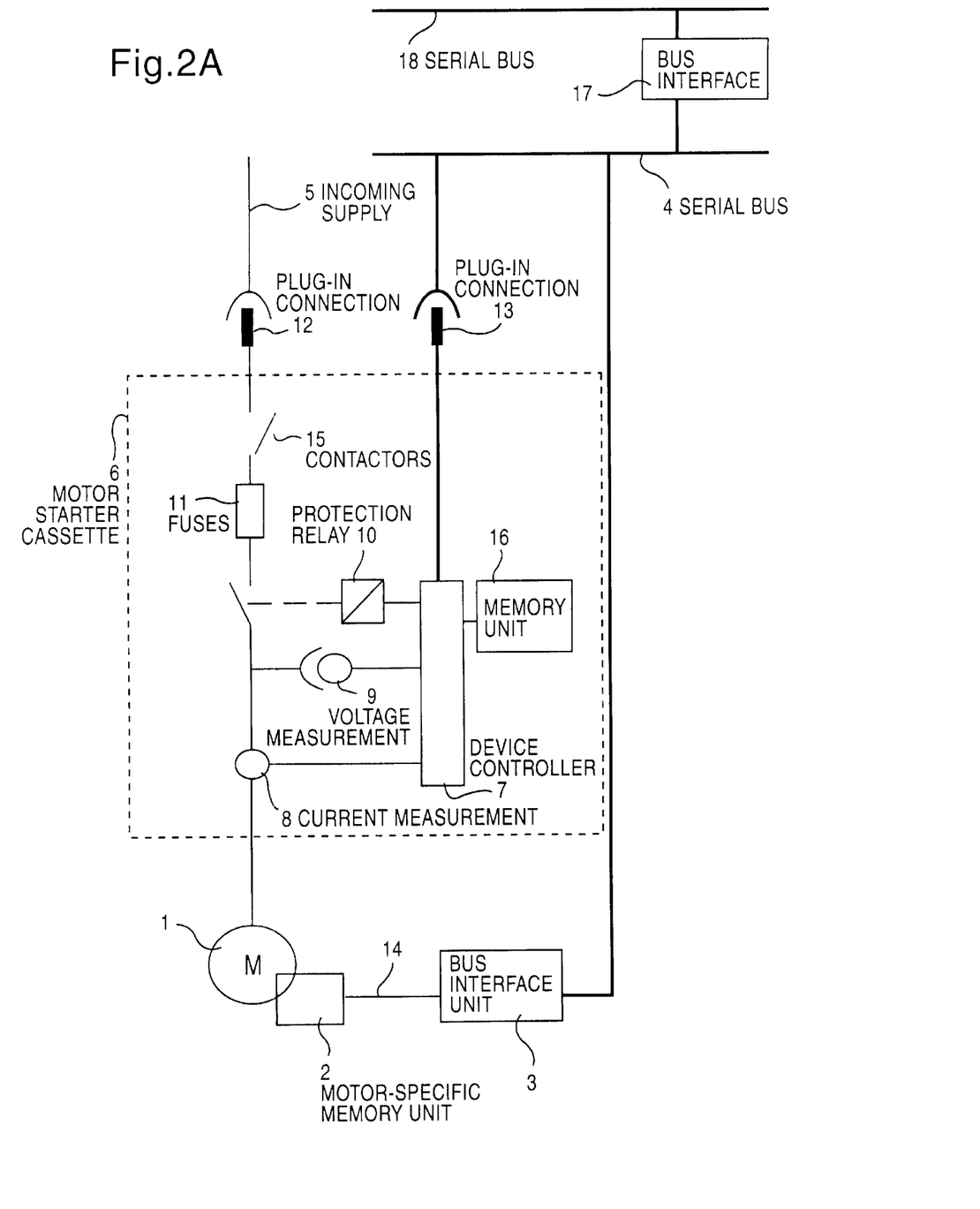
FIG. 2A discloses a schematic view of another embodiment of the present invention.
Figure 2B:
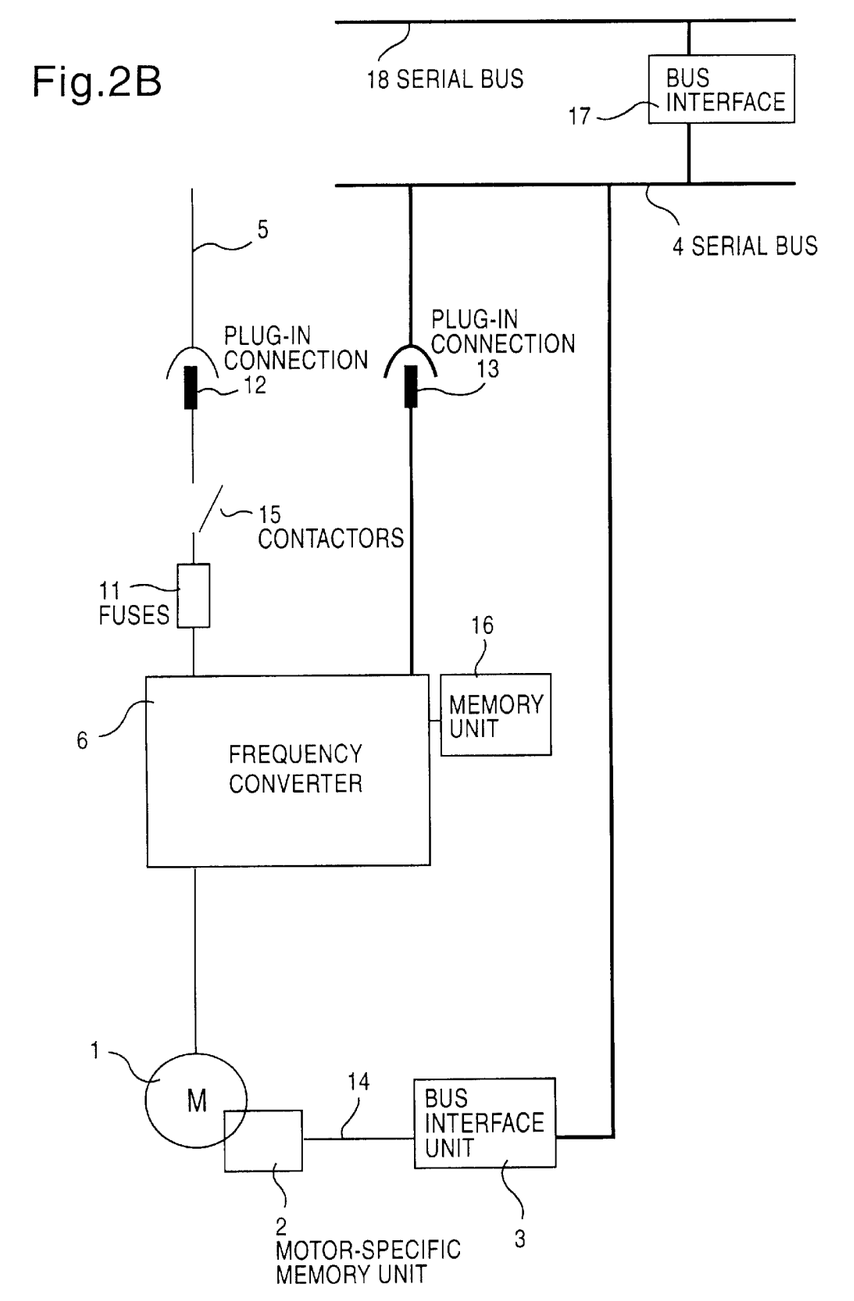
FIG. 2B, discloses a schematic view of yet another embodiment of the present invention.

FIGS. 2A and 2B disclose additional systems including an electric motor comprising thereto attached memory means. The electric motor 1 is controlled by a withdrawable motor starter cassette 6 which is resident in the switchedgear (components of the cassette 6 shown within the dashed line). The motor starter 6 comprises a device controller 7 which monitors, controls and protects the motor using voltage measurement 9 and current measurement 8. The device controller also has a relay output to a protection relay 10. The motor starter further comprises fuses 11 and contactors 15. In this embodiment, the motor starter cassette includes a memory unit 16 which contains the information about the components and devices inside the cassette. The cassette-type motor starter has a plug-in connection 12 to the incoming supply 5 from the distribution bar system in the switchgear and a plug-in connection 13 to a serial bus 4 inside the switchgear. A motor-specific memory unit 2 is located in the motor and connected to the serial bus 4 by the permanent or removable wiring or other means of communication 14 and the bus interface unit 3 near the motor. The switchgear serial bus 4 is further connected to factory serial bus 18 by the bus interface 17. FIG. 2B shows that a frequency converter can alternatively be used instead of a motor starter cassette.

Figure 3:
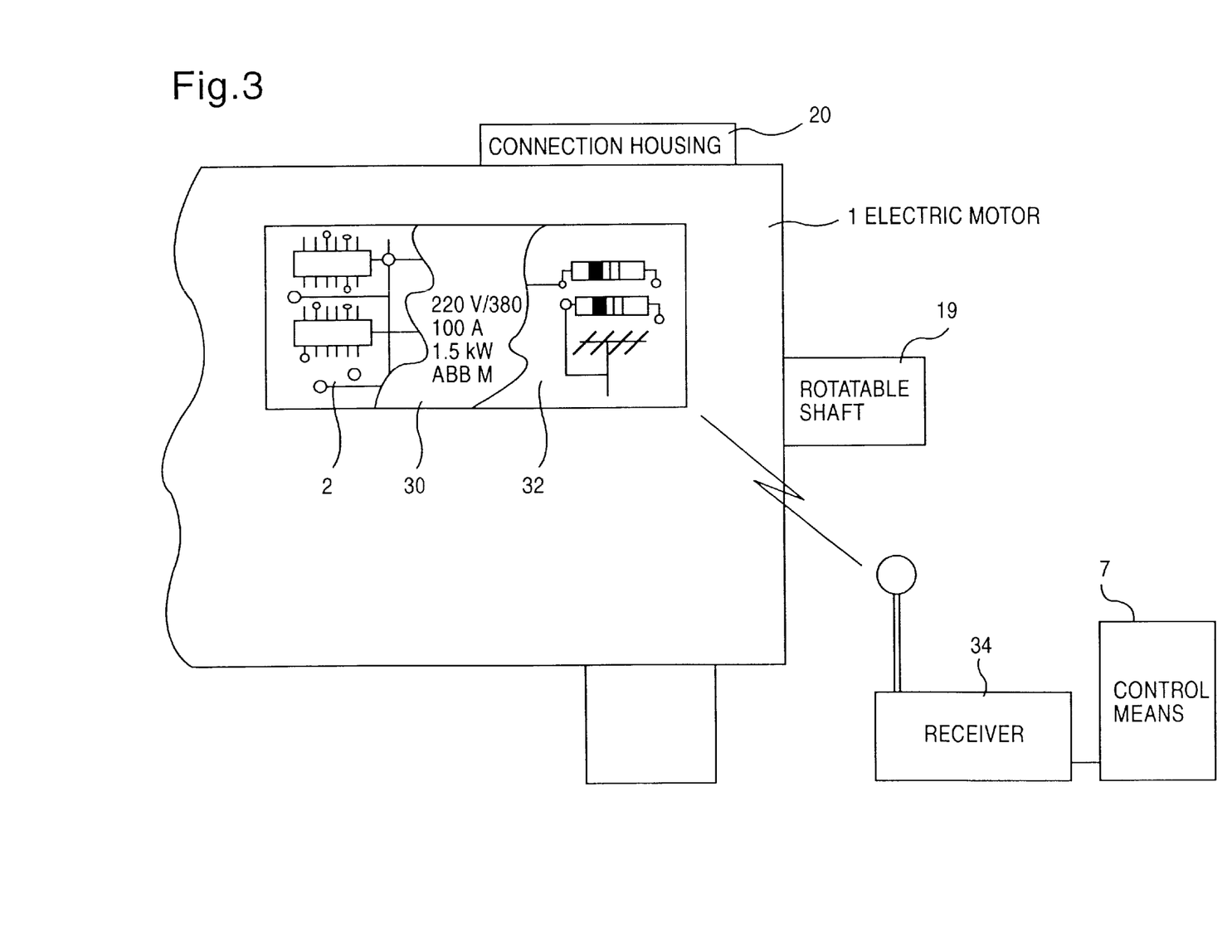
FIG. 3 discloses a multifunction rating plate attached to an electric motor.

FIG. 3 discloses, partially in section, a preferred possibility for the memory means. In this the memory means 2 is implemented in connection with the rating plate 30 of the electric motor 1. The necessary circuitry for the memory means 2 is implemented on the back side of the plate 30, being thus protected by the plate 30. By means of this a multifunction rating plate is provided, which provides the rating information both in conventional written form and also in form of electric data, and can thus be read both visually and electrically.

In addition to the implementation of integrated memory means in the rating plate 30, FIG. 3 discloses also an additional feature according to which the memory means 2 are connected to a radio transmitter 32. This kind of radio interface was already discussed in connection with FIG. 1. According to the basic scenario of this embodiment, the transmitted radio signals are received by a receiver apparatus 34 connected to the control means 7 of the system. In case the apparatus 32 and 34 are both transceivers, the data transmission from the memory means 2 can be activated by a signal from the transceiver apparatus 34 to the transceiver apparatus 32. However, the activation can also be done otherwise, e.g. manually by pressing an activation button or similar means in connection with the electric motor.

In case wiring is used for the data communications, such as in FIG. 1, the necessary interface between the rating plate and the control unit is provided with appropriate plugging and cables. According to one possibility the data communications between the connection housing 20 and the control unit is at least partly accomplished by using the power feed cabling of the machine.

The electric motor can be provided with auxiliary devices such as with a bearing condition monitoring unit. It is possible to position the memory means in connection with this unit or any other auxiliary device, or even integrate the motor specific data memory means into the electronics of the auxiliary device.

According to one alternative the power to the electric motor is fed by a frequency converter. The frequency converter is an apparatus well known in the art, and is used e.g. for controlling the rotation speed of an electric motor. It is possible to connect the frequency converter to a bus or similar data transmitting connection and to transmit necessary data from the memory means to the frequency converter, and thereafter to set-up and operate it in accordance with the data received from the memory means.

Figure 4:
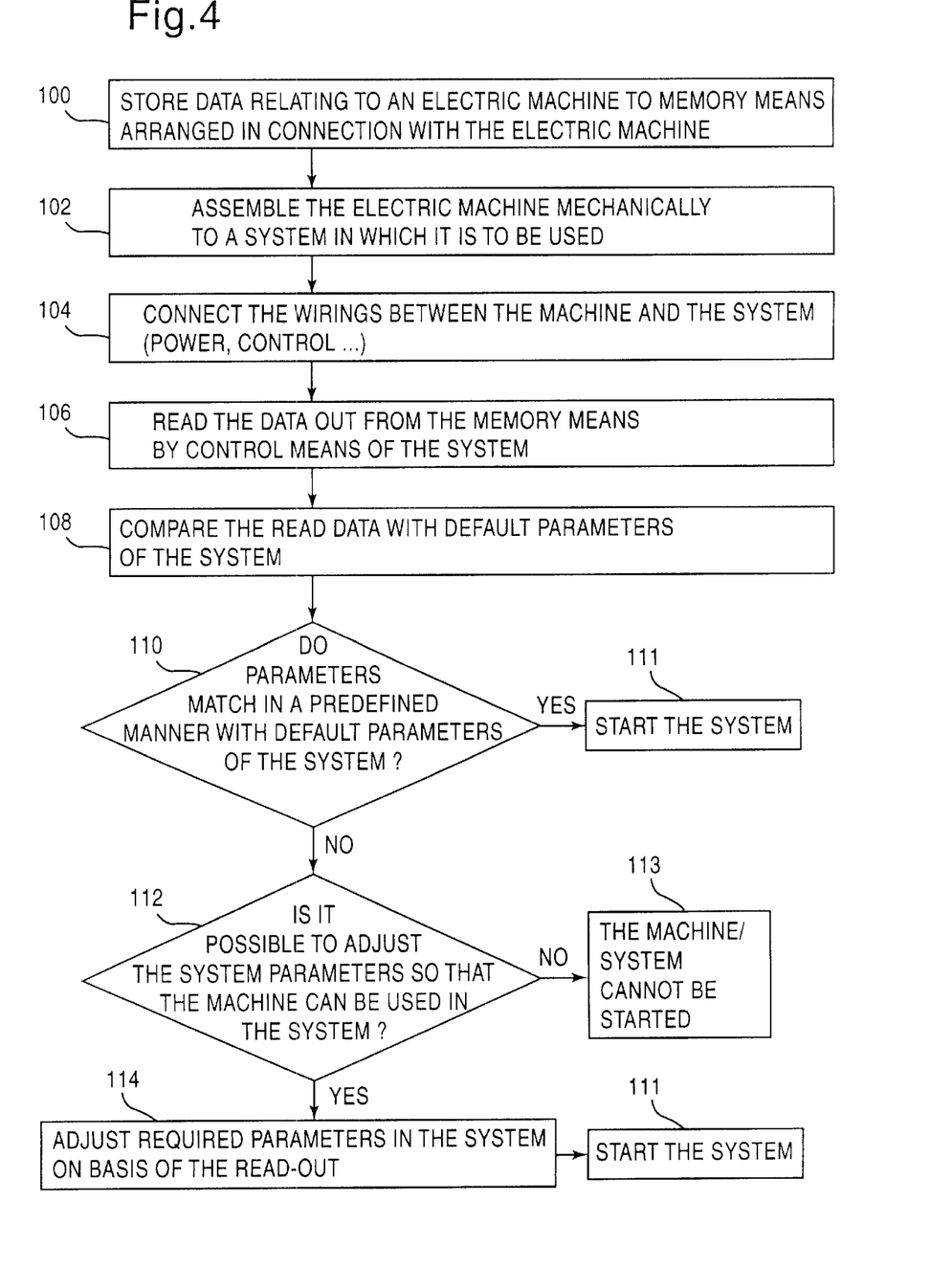
FIG. 4 discloses a flow chart for operation in accordance with principles of the present invention.

FIG. 4 discloses a flow chart for one possible way to operate the inventive solution. At step 100 data considered as necessary is stored in memory means arranged in connection with an electric machine. This can be accomplished in any stage before the actual installation and set-up step of the electric machine, such as during the manufacture or inspection of the machine, or even to an already installed machine whenever this is felt necessary. Thereafter the machine is installed at step 102 mechanically, such as assembled to a bed in a factory and connected to apparatus it is intended to rotate. At step 104 the required wirings or connections to power source and control apparatus are provided. At step 106 the data within the memory means is read by the control unit of the system.

After the data has been read, and is thus available for the control unit of the system, it is verified at step 108 with default parameters stored in the system. The default parameter data is preferably stored in a database of the control unit, but can also be retrieved from any other database accessible by the control unit accomplishing the comparing procedures.

In case the read motor specific parameters match in a predefined manner with the default parameters (step 110), the electric machine and the system can be started (step 111). In case there is a need for adjustment, and this can be accomplished by the system, then these adjustments are accomplished at step 114, and the system is started after the adjustable/selectable parameters of the system are adjusted in accordance with the read data. However, in case the control unit defines in step 112 that it is not possible to perform the required adjustments in the system, the start-up of the system is prevented (step 113).

The predefined acceptable range in variation of the read parameters from the default parameters can be defined in the database of the control unit. In addition, the adjustments and/or measurements required to enable the use of the machine in the system and to automatically bring the electric machine and the system into conformity are also preferably defined in the database of the control unit.

As the system automatically identifies any possible changes a new electric machine may introduce to the former parameters, e.g. to the parameters of the protection device, these will be updated automatically or the system cannot be started before these are updated, either automatically if this is possible of manually when greater modifications are required. Therefore a risk for any damages due to improper settings or improperly sized components is minimised.

Thus, the invention provides apparatus and a method by which a significant improvement is achieved in the area of installing and/or configuring an electric machine in a system. It should, however, be understood that the above description of examples of the invention is not meant to restrict the invention to the specific forms presented in this connection but rather the present invention is meant to cover all modifications, similarities and alternatives which are included in the spirit and scope of the present invention, as defined by the appended claims. For instance, upon reading the above description together with the annexed drawing it will be obvious to the skilled person to use a machine vision arrangement (a camera and data processing device comprising an image processing device) to read e.g. a bar code, a character string, a special pattern or similar means attached to an electric machine and/or a magnetic stripe and an appropriate reader used instead of any electronic arrangements.

What is claimed is:

1. A system comprising:

an electric machine;

memory means for storing information concerning the electric machine and fixedly attached in connection with the electric machine;

at least one control unit adapted to control the operation of the electric machine;

and interface between the memory means and said at least one control unit so that said at least one control unit is enabled to read the information stored in the memory means, wherein the control unit is arranged to process the information read from the memory means such that the information becomes verified with default parameters of the system after read-out thereof, and in case the information includes parameters which do not match in a predefined manner with the default parameters, the control unit is arranged to either automatically adjust the system in accordance with the information received from the memory means or to prevent start-up of the electric machine or the entire system.

2. The system according to claim 1, wherein the information stored in the memory means comprises at least a part of the following parameters: rating plate parameters (U, I, cos j, f, W, r/min), instructions for maintenance and/or lubrication, bearing information, thermal behavior, parameters for protection and/or control devices, the phase of the electric machine, the manufacturer of the electric machine, the standards the electric machine fulfills and/or according to which it has been constructed, weight of the machine, and special conditions for use.

3. The system according claim 1, wherein the memory means is accomplished by means of a writable memory or processor fixedly attached in connection with the electric machine.

4. The system according to claim 1, wherein the memory means are accomplished in connection with a rating plate of the electric machine.

5. The system according to claim 1, wherein the interface between the memory means and the control unit is at least partially implemented by means of the power supply cabling of the electric machine.

6. The system according to claim 1, wherein the interface between the memory means and the control unit is a radio connection, an infrared connection or an ultrasonic connection.

7. The system according to claim 1, wherein the interface between the memory means and the control unit and/or another functional unit requiring machine related information is implemented by means of a portable computer arranged to read the information from the memory means and to transmit the information further to the control unit and/or said other functional unit.

8. The system according to claim 1, wherein the memory means interfaces a control panel arranged substantially close to the electric machine, wherein said control panel is arranged to interface a further control unit of the system by means of a bus and a bus connection device.

9. The system according to claim 7, wherein it further includes a frequency converter for feeding power to the electric machine.

10. A system according to claim 3, wherein the writable memory or processor is a microchip or an electronic memory tag.

11. The system according to claim 3, wherein the writable memory or processor comprises a microchip or an electronic memory tag.

12. The system according to claim 3, wherein the memory means is fixedly attached within the connection housing of the electric machine or on the outer surface of the shell of the electric machine.

13. The system according to claim 6, wherein the interface between the memory means and the control unit is implemented by means of a separate reading device.

14. The system according to claim 6, wherein the interface between the memory means and the control unit is implemented by a machine vision arrangement.

15. The system according to claim 9, wherein the frequency converter includes the memory means.

16. A method of installing an electric machine to a system, said system comprising control means controlling the operation of the electric machine when the electric machine is installed in the system, the method comprising:

storing information relating to the electric machine in a memory means attached in connection with the electric machine;

reading at least a part of the information stored to the memory means by the control means via an interface between the memory means and the control means;

comparing the read information with default parameters to ensure that the electric machine can be used in the system; and in case the read information includes parameters which do not match in a predefined manner with the default parameters either automatically adjusting the control means and/or the system in accordance with the read information or preventing the electric machine and/or system to be started.

17. The method according to claim 16 wherein rating plate parameters of the electric machine are included in the memory means.

18. The method according to claim 16, wherein the information is stored in the memory means during the manufacture thereof or during final testing and/or inspection thereof at the manufacturer, and that the information comprises at least a part of the following parameters: rating plate parameters (U, I, cos j, F, W, R/min), instructions for maintenance and/or lubrication, bearing information, thermal behavior, parameters for protection and/or control devices, the phase of the electric machine, the manufacturer of the electric machine, the standards the electric machine fulfills and/or according to which it has been constructed, weight of the machine, and special condition for use.

19. The method according to claim 16 wherein data communications between the memory means and the control unit is implemented by means of power supply cabling of the electric machine.

20. A rating plate for an electric machine, comprising:
visually readable motor specific rating information in one side thereof, wherein the rating plate is provided with electric memory means for storing motor specific rating information and means for interfacing a remote control means to enable a read-out of the information by the remote control means.

\* \* \* \* \*